US009495849B2

(12) United States Patent
Jentoft

(10) Patent No.: US 9,495,849 B2
(45) Date of Patent: Nov. 15, 2016

(54) SECURITY MONITORING SYSTEM

(75) Inventor: Keith A. Jentoft, Circle Pines, MN (US)

(73) Assignee: RSI Video Technologies, Inc., Vadnais Heights, MN (US)

( * ) Notice: Subject to any disclaimer, the term of this patent is extended or adjusted under 35 U.S.C. 154(b) by 343 days.

(21) Appl. No.: 13/204,038

(22) Filed: Aug. 5, 2011

(65) Prior Publication Data

US 2013/0033379 A1    Feb. 7, 2013

(51) Int. Cl.
| G08B 13/00 | (2006.01) |
| G08B 13/196 | (2006.01) |
| H04N 7/18 | (2006.01) |
| G08B 25/00 | (2006.01) |
| G08B 29/18 | (2006.01) |

(52) U.S. Cl.
CPC ....... *G08B 13/19656* (2013.01); *G08B 25/004* (2013.01); *G08B 29/181* (2013.01); *H04N 7/185* (2013.01); *G08B 13/19695* (2013.01)

(58) Field of Classification Search
USPC ............... 340/541–567, 539.25, 506, 3.1; 348/143, E7.085–E7.088, E7.09; 375/40.26, 240.01; 725/105, 62; 726/4, 726/26–30
See application file for complete search history.

(56) References Cited

U.S. PATENT DOCUMENTS

| 4,857,912 A | 8/1989 | Everett, Jr. et al. |
| 4,882,567 A | 11/1989 | Johnson |
| 5,237,330 A | 8/1993 | Yaacov et al. |
| 5,473,368 A | 12/1995 | Hart |
| 5,515,029 A | 5/1996 | Zhevelev et al. |
| 5,661,471 A | 8/1997 | Kotlicki |
| 5,693,943 A | 12/1997 | Tchernihovski et al. |
| 5,703,368 A | 12/1997 | Tomooka et al. |
| 5,790,040 A | 8/1998 | Kreier et al. |
| 5,832,671 A | 11/1998 | White |

(Continued)

FOREIGN PATENT DOCUMENTS

| DE | 4423947 A1 | 1/1996 |
| EP | 0986038 | 3/2000 |

(Continued)

OTHER PUBLICATIONS

"Indoor Motion Viewer DCV601" Datasheet [online]. RSI Video Technologies, Feb. 22, 2013, http://www.videofied.com.au/pdf/2013/Installation%20sheets%202013/DCV701%20Indoor%20Motionviewer%20install%20sheet.pdf pp. 1-4.

(Continued)

*Primary Examiner* — Firmin Backer
*Assistant Examiner* — Nay Tun
(74) *Attorney, Agent, or Firm* — Crawford Maunu PLLC

(57) ABSTRACT

In one embodiment, a monitoring system is provided. The system includes one or more monitoring devices configured to generate respective video signals, and a control circuit. The control circuit is configured to allow a user remote access to the video signals in response to a request for remote access by the user via the WAN interface and the control circuit operating in an alarm state. The control circuit is configured to deny the user access to the video signals in response to a request for remote access by the user via the WAN interface and the control circuit operating in a non-alarm state.

21 Claims, 4 Drawing Sheets

(56) References Cited

U.S. PATENT DOCUMENTS

| | | |
|---|---|---|
| 5,850,180 A | 12/1998 | Hess |
| 5,936,524 A | 8/1999 | Zhevelev et al. |
| 6,037,902 A | 3/2000 | Pinhas et al. |
| 6,211,522 B1 | 4/2001 | Kotlicki et al. |
| 6,504,479 B1 | 1/2003 | Lemons et al. |
| 6,700,487 B2 | 3/2004 | Lyons et al. |
| 6,768,294 B1 | 7/2004 | Moldavsky et al. |
| 6,768,868 B1 | 7/2004 | Schnell |
| 6,818,881 B1 | 11/2004 | Chernichovski et al. |
| 6,819,239 B2 | 11/2004 | Bingham |
| 6,965,313 B1 | 11/2005 | Saylor et al. |
| 7,079,028 B2 | 7/2006 | Herrmann et al. |
| 7,081,817 B2 | 7/2006 | Zhevelev et al. |
| 7,106,193 B2 | 9/2006 | Kovach |
| 7,463,145 B2 | 12/2008 | Jentoft |
| 7,463,146 B2 | 12/2008 | Reibel et al. |
| 7,471,334 B1 | 12/2008 | Stenger |
| 7,619,512 B2 | 11/2009 | Trundle et al. |
| 7,835,343 B1 | 11/2010 | Reibel |
| 8,259,816 B2 * | 9/2012 | Coleman, Sr. ............ 375/240.26 |
| 8,390,462 B2 * | 3/2013 | Belz et al. ................. 340/573.1 |
| 2001/0028798 A1 | 10/2001 | Manowitz et al. |
| 2002/0080029 A1* | 6/2002 | Menard et al. ................. 340/541 |
| 2002/0147982 A1* | 10/2002 | Naidoo et al. ................. 725/105 |
| 2002/0159770 A1 | 10/2002 | Moultrie, Jr. |
| 2002/0171557 A1 | 11/2002 | Wegener |
| 2003/0128130 A1 | 7/2003 | Kao |
| 2004/0086088 A1* | 5/2004 | Naidoo et al. .................. 379/37 |
| 2004/0113778 A1 | 6/2004 | Script et al. |
| 2005/0073580 A1 | 4/2005 | Takeda et al. |
| 2005/0123172 A1* | 6/2005 | Henson ......................... 382/103 |
| 2006/0226977 A1* | 10/2006 | DeLozier et al. ............ 340/541 |
| 2006/0250501 A1 | 11/2006 | Widmann et al. |
| 2007/0018106 A1 | 1/2007 | Zhevelev et al. |
| 2007/0063840 A1* | 3/2007 | Jentoft ........................ 340/541 |
| 2008/0079561 A1 | 4/2008 | Trundle et al. |
| 2008/0224862 A1* | 9/2008 | Cirker .............. G08B 13/19652 340/540 |
| 2008/0311878 A1 | 12/2008 | Martin et al. |
| 2010/0080548 A1 | 4/2010 | Peterson et al. |
| 2010/0092764 A1 | 4/2010 | Chung et al. |
| 2010/0232518 A1* | 9/2010 | Coleman, Sr. ........... 375/240.26 |
| 2010/0289644 A1 | 11/2010 | Slavin et al. |
| 2011/0183643 A1 | 7/2011 | Martin et al. |
| 2012/0086767 A1* | 4/2012 | Lau et al. .................. 348/14.02 |
| 2013/0148950 A1 | 6/2013 | Chang |

FOREIGN PATENT DOCUMENTS

| | | |
|---|---|---|
| EP | 1363260 | 11/2003 |
| EP | 1575009 | 9/2005 |
| GB | 2395336 A | 5/2004 |
| WO | WO8800747 | 1/1988 |
| WO | WO9725696 | 7/1997 |
| WO | WO0127763 | 4/2001 |
| WO | WO2005034060 | 4/2005 |

OTHER PUBLICATIONS

European Search Report, European Patent Application No. 15158810.0, 2 pgs. (Jul. 17, 2015).

* cited by examiner

SECURITY MONITORING SYSTEM

The present disclosure is directed to a security arrangement and method for monitoring a facility or residence.

OVERVIEW

In order to protect residents, employees, personal property, and the like, security monitoring systems are used to monitor a variety of facilities and to sense the presence of an unwanted intruder. Many such security systems are connected to a central control unit and monitored by an operator who can alert the appropriate emergency services in the event of an unwanted intruder. A home monitoring security system can include a combination of sensing devices, alarm devices, and/or cameras. To achieve the maximum monitoring coverage, these devices are distributed throughout the interior of the facility.

Security systems typically include a mechanism (such as a keypad) for arming/disarming the system in order to allow authorized users access to the secured area. When armed, the system monitors one or more sensing devices, such as door/window contacts or glass-break detectors, to detect when an intrusion has occurred. In response to detecting an intrusion, the system enters and remains in an alarm state until the alarm is reset by a user or third party to place the system in a non-alarm state, where the system is disarmed or armed but no intrusion has been detected.

Security systems that employ cameras are advantageous in that they are able to record activity associated with a suspected breach of the facility. In some instances, however, the cameras record the regular activities of the facilities' residents and/or employees. The cameras also record activities that are falsely perceived to be security breaches such as pet behaviors and authorized users that have been accidentally locked out.

Some security systems have remote access capability that allow a security firm to remotely access a video/or images recorded by the cameras. This allows the security firm to access the recorded video, and identify false alarms, or provide information to police dispatch, in response to an indicated security breach. However, such remote access has the potential to violate the privacy of authorized residents and/or employees of the facility, at times in which no breach is indicated. Since unwanted intruders could breach the security of a facility while the inhabitants are present, it is desirable for the security monitoring system to be functioning at all times. However, the possibility that a third party may remotely view and/or record the inhabitants' daily living and working routines is a dramatic invasion of the inhabitants' privacy, and is burdensome with respect to false triggers. Further, the monitoring and recording of guests' activities can be just as invasive.

Implementing small detectors and cameras presents a host of problems. For security reasons, ease of installation and flexibility of a system, it may be difficult to electrically connect detectors and cameras to other components. More specifically, detectors and cameras that operate using an external power source, such as an electrical outlet, can be circumvented by removing the power source. This presents a number of security weaknesses in the overall system. Moreover, reliance on an external power source often complicates the installation process because the installation requires a connection to the external power source. This may require routing of wires carrying power to the detectors and cameras. Small devices have the additional problem of not having space to include large independent power sources, such as batteries. Accordingly, the functionality and time between charging of the devices is often sacrificed for size. For example, wireless communications protocols can rapidly drain batteries and other power sources. Other power hungry portions of cameras and detectors include the camera, the detector, image processing, and illumination devices. These and other problems have hampered the implementation of small, portable cameras and detectors used in security applications.

The present disclosure is directed to the above and related types of integrated security systems. These and other aspects of the present disclosure are exemplified in a number of illustrated implementations and applications, some of which are shown in the figures and characterized in the claims section that follows.

In one embodiment, a monitoring system is provided. The system includes one or more monitoring devices configured to generate respective video signals. The system includes a control circuit having a local area network (LAN) interface, a wide area network (WAN) interface, and a logic circuit coupled to the LAN and WAN interfaces. The LAN interface is configured and arranged to receive the video signals generated by the one or more monitoring devices. The logic circuit is configured to allow a user remote access to the video signals in response to a request for remote access by the user via the WAN interface and the control circuit operating in an alarm state in response to detecting an intrusion. The logic circuit is configured to deny the user access to the video signals in response to a request for remote access by the user via the WAN interface and the control circuit operating in a non-alarm state in which no intrusion has been detected.

In another embodiment, a monitoring system is provided. The monitoring system includes one or more monitoring devices configured and arranged to generate respective video signals and a control circuit. Control circuit 110 includes a LAN interface, a WAN interface, and a logic circuit coupled to the LAN and WAN interfaces. The LAN interface is configured to receive the video signals generated by the one or more monitoring devices. The logic circuit is configured to transmit video data, derived from the video signals, to a user via the WAN interface in response to entering an alarm state of operation. While in a non-alarm state of operation, the logic circuit is configured to deny the user remote access to the video signals.

The above discussion of the present disclosure is not intended to describe each illustrated embodiment or every implementation. The figures and detailed description that follow more particularly exemplify these embodiments.

BRIEF DESCRIPTION OF THE DRAWINGS

The disclosure may be more completely understood in consideration of the detailed description of various embodiments of the disclosure in connection with the accompanying drawings, in which.

Figure 1:
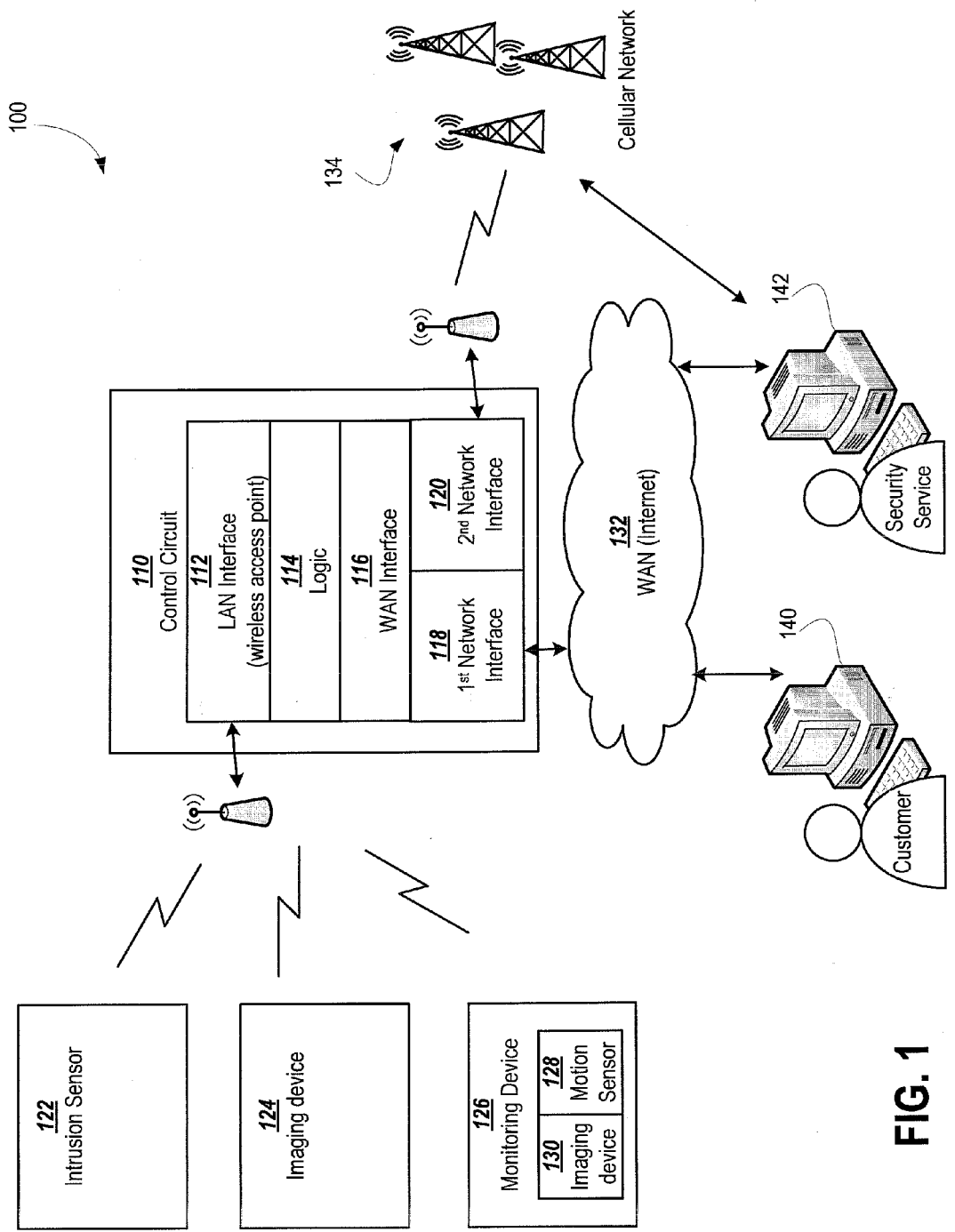
FIG. 1 shows a security system with controlled remote video access, consistent with one or more embodiments of the present disclosure.

While the disclosure is amenable to various modifications and alternative forms, specifics thereof have been shown by way of example in the drawings and will be described in detail. It should be understood, however, that the disclosure is not necessarily to limit the embodiments to the examples provided herein. On the contrary, the disclosure is to cover all modifications, equivalents, and alternatives falling within the spirit and scope of the disclosure.

DETAILED DESCRIPTION

The disclosed embodiment may be applicable to a variety of different approaches for, and arrangements used in, security monitoring. One or more embodiments may be particularly advantageous for addressing security-monitoring applications in a residence or office-facility environment where remote video access is desired.

Aspects of the present disclosure are directed toward the ability to provide remote access to video images over the Internet. For instance, the security system can be configured with a control circuit that coordinates communications with various remote monitoring devices. The control circuit is configured to allow authorized users to remotely monitor video of the premises and/or adjust system controls from an off-premises location via the Internet.

One or more embodiments are directed toward a security monitoring system, which allows remote access to video data using user permissions that are dependent on the alarm state of the system. When armed, the system monitors one or more intrusion sensors, such as door/window contacts or glass-break detectors, to detect when an intrusion has occurred. In response to detecting an intrusion, the system enters and remains in an alarm state until the alarm is reset by a user or third party to place the system in a non-alarm state, where the system is disarmed or armed but no intrusion has been detected.

The system allows a first user, such as a security service or law enforcement agency, to have remote video access when the system is operating in an alarm state, in response to detecting an intrusion, but does not allow the user to have remote video access when operating in a non-alarm state. This allows a security firm or law enforcement agency to assess and respond appropriately to an alarm while protecting the privacy of individuals on the premise when an alarm is not active. In some embodiments, the system may be configured to allow a second user, such as a homeowner, greater permissions including remote video access when an alarm is not active. This can allow a homeowner to monitor the premises as desired and allow a security service to assess instances of alarms while maintaining a desired level of the privacy for individuals on the premise.

FIG. 1 shows a security system with remote access that may be configured in accordance with one or more embodiments of the present disclosure. The system 100 includes a control circuit 110 and one or more monitoring devices 122, 124, and 126, with monitoring devices 124 and 126 configured to capture video data. The control circuit 110 is configured to receive video signals from one or more of the monitoring devices over a local area network (LAN) and allow a first user, such as a security service 142, remote access to the video signals over a wide area network (WAN), such as the Internet 132, in response to an alarm. If the system is not in an alarm state, the control circuit 110 is configured to deny the first user remote access to the video signals. In some embodiments, the control circuit 110 may be configured to allow a second user, such as a customer 140, remote access to the video signals via the WAN regardless of whether the system is operating in an alarm state or not. Some example configurations of user permissions as discussed in more detail in connection with FIG. 2 and FIG. 3 below.

The control circuit 110 includes a LAN interface 112, a WAN interface 116, and a logic circuit 114 coupled to the LAN and WAN interfaces. The LAN interface 112 is configured and arranged to facilitate communication between the logic circuit 114 and the one or more of the monitoring devices 122, 124 and 126. The WAN interface is configured to facilitate communication between remote users 140 and 142 and the logic circuit. The logic circuit receives and processes video signals generated by the monitoring devices and allows remote users access to the video signals based on permissions that are dependent on an alarm state of the system.

In different implementations, remote access may be initiated using a number of different mechanisms. For example, in some implementations, the logic circuit 114 may be configured to allow or deny remote access in response to a request for remote access received from a user 140 or 142 via the WAN interface 116. In some other implementation, the logic circuit may be configured to allow remote access by automatically transmitting the video signals to a specific user in response to a trigger event. For example, the logic circuit may be configured to automatically transmit video to the security service 142 in response to an alarm. When remote access is allowed, the logic circuit 110 may be configured to transmit video signals to a user in any number of different video formats, which may include streaming and/or non-streaming video formats.

The security system may implement or operate in conjunction with a number of different user interfaces for a user to request remote video access and/or adjust security settings of the system. In one or more embodiments, the system may be configured to host a server (not shown) at an assigned static or dynamic IP address. The server functions as a gateway between the LAN, where the control circuit resides, and the WAN, where a remotely-accessing user resides. The software identifies whether an incoming communication, to the static IP address of the server, is a user request to access the security system.

In one implementation, the server may be a web-page server that provides an interface that may be remotely accessed using a web-browsing application, such as Internet Explorer® or Google Chrome™ browser. In another implementation, the server may be a data server configured to operate in conjuncture with a customized software application running on a remote computer or smartphone.

In one or more other embodiments a third party (e.g., a security firm) may operate an intermediary system located in the WAN that facilitate communication between a remote user and the system. The intermediary system may host a web-server or data server to provide a user interface as described above. Data requests sent from a remote user may be forwarded to the system, and video (and other security parameters) provided from the security system may be forwarded to the remote user. In one implementation, the security system is configured to host a data server configured to operate in conjuncture with a customized software running on the intermediary system. In another implementation, the security system is configured to operate a customized client application configured to log into a data server operated by the intermediary system. The example user interface systems described above are provided for discussion purposes. It is recognized that the security system may be implemented to provide remote access by other means as well.

The remote user interface provided by the system may provide a number of different services to an authenticated user. For example, in addition to remote video access, one or more implementations of the user interface may allow the remote user to view status or activity logs of the monitoring devices (e.g., intrusion detectors, motion sensors, etc.), alarm state of the system, power usage, etc. In one more embodiments, authorized users may be able to modify security settings or state of the control circuit 110 and/or monitoring devices 122, 124, and 126. As one example, a user may be able to remotely arm or disarm the system remotely. As another example, if a monitoring device (e.g., 126) is configured to disable imaging device 130 unless motion is detected by the motion sensor 128, the user interface may allow the user to enable the imaging device 130 even if no motion is detected.

The system may include a number of different monitoring devices. In this example, the system includes an intrusion sensor 122 (e.g., door/window contacts or glass-break detectors), an imaging device 124, and a monitoring device 126 that incorporates an imaging device 130 and a motion sensor 128. The imaging devices 124 and 130 generate video signals that may be transmitted to the logic circuit.

In one or more embodiments, the system may be configured to enable and disable one or more of the monitoring devices 122, 124, and 126 in response to intrusion conditions. For example, a system user may set up zones with at least one intrusion sensor 122 for each zone around the perimeter of a facility and set up corresponding imaging devices 124 or other monitoring devices in the interior of the facility. Intrusion sensors may be activated (armed) by a system user using a control interface (not shown), e.g., a keypad on a security panel, a remote control fob, a phone call with DTMF, or smart phone application. This allows for a complete activation of the system when the system user leaves the facility as well as a partial perimeter activation of the facility when the system user (or other authorized person) is present. The system may disable one or more monitoring devices in an area and enable those devices in response to an intrusion signal generated by the intrusion sensor 122 when an intrusion is detected. In this manner, power may be saved by not operating some of the monitoring devices unless an intrusion is detected at the perimeter of an area. In various implementations, the intrusion signal may be used to inform the control circuit or one or more peripheral devices, which may be configured to take action in response to the intrusion signal.

Similarly, monitoring device 126 and/or control circuit 110 may selectively enable the imaging device 130 when motion is detected by the motion sensor 132. In this manner, power may be saved. For further information regarding monitoring devices including monitoring devices which have an integrated motion detector and image-capture device, reference may be made to U.S. Pat. No. 7,463,146, entitled "Integrated Motion-Image Monitoring Method And Device," which is herein fully incorporated by reference.

It is recognized that the monitoring devices illustrated in FIG. 1 are included for the purpose of illustration and discussion and are not intended to limit possible monitoring devices that may be included in the system or the operation thereof.

The LAN interface may communicate with the monitoring devices 122, 124, and 126 using a number of different LAN architectures and or protocols. In one implementation, the LAN is set up using a centralized architecture. For example, the LAN interface 112 can be configured to operate as a wireless access point for the various security devices. In another implementation, the security devices are configured without a centralized access point using ad hoc protocol, such as ZigBee™. Ad hoc protocols can be particularly useful as each security device does not necessarily need to be able to directly communicate with the control panel. Rather, communications can be passed between security devices before reaching the control panel. This can result in an increase in the effective range of the security devices, relative to the control panel, without a corresponding increase in transmission power.

For ease of illustration, the embodiments and examples are primarily described with reference to a LAN interface 112 that implements a wireless protocol to communicate with the monitoring devices 122 over a centralized wireless LAN, where the LAN interface operates as a wireless access point for the monitoring devices. Each of the monitoring devices may be configured with LAN-IP addresses (e.g., using either Dynamic Host Configuration Protocol (DHCP) or statically-assigned LAN IP addresses). However, the envisioned embodiments are not so limited and may implement the LAN interface to communicate with the monitoring devices 122, 124, and 126 using a wired LAN and/or decentralize architecture as well. In this example, the LAN interface is configured to communicate with the peripheral monitoring devices 122 using a wireless communication protocol represented by the jagged lines found between the control circuit 110 and the monitoring devices 122, 124, and 126. The wireless communications may be implemented using suitable frequencies. For instance, wireless communications frequencies in residential, industrial, scientific and medical (ISM) radio bands (e.g., 900 Mhz, 2.4 Ghz and 5.8 Ghz) have been found to be suitable for security systems; however, alternate frequencies may be implemented in accordance with the particulars of the system or its intended implementation. For security purposes, video signals transmitted from the monitoring devices to the control circuit 110 may be encrypted before being transmitted to the control circuit 110. For some example implementations related to wireless communication to and from monitoring devices, reference may be made to U.S. Pat. No. 7,835,343 filed on Mar. 24, 2006, entitled "Spread Spectrum Communications for Building-Security," which is fully incorporated by reference herein.

In one or more embodiments, the control circuit 110 and/or monitoring devices 122, 124, and 126 are configured to switch from a primary power source to a backup power source, such as a battery backup, in the event of a loss of power, e.g., a natural disaster or an intruder disables power to the facility. Similarly, in one or more embodiments, the WAN interface 116 may be configured to utilize different communication networks via respective communication network interfaces 118 and 120 (depending on availability) to communicate with users 140 or 142. In this example, the WAN interface 116 is configured to use a first network interface 120 (when available) to communicate with users 140 or 142 via the Internet 132. The first network interface 118 can provide an Internet connection using various different protocols including, but not limited to, a dial up connection, integrated services digital network (ISDN), digital subscriber line (DSL), point-to-point protocol over Ethernet (PPPoE), Wi-Fi hotspots, satellite connections, etc.

If the first network interface 118 is disabled or otherwise unable to achieve an Internet connection, the WAN interface 116 is configured to communicate with users 140 or 142 over a cellular network 134 using a second network interface 120, which can operate using a cellular protocol (e.g., CSD, GPRS, EDGE, EVDO, HSPA, etc). Switching behavior between different power sources and communication network interfaces 118 and 120 are discussed in more detail in connection with FIG. 4 below.

For the purposes of discussion, the following scenario describes a possible scenario of how a homeowner may operate the security system shown in FIG. 1 to monitor a residence in accordance with one or more embodiments. When the homeowner leaves his residence, the homeowner arms the security system using a physical user interface such as a wall mounted keypad. Once the system is armed, the system monitors one or more intrusion sensors, such as door/window contacts or glass-break detectors, to detect when an intrusion has occurred.

While away, the homeowner may remotely log into the security system using a remote user interface that can be accessed by a web browser on a computer, or a customized application on their smartphone, for example. The remote user interface establishes connection with the security system, via the interne, and authenticates the homeowner with the security as a first user login. The security system may retrieve permissions and applicable restrictions corresponding to the first allowed user and send a list of the permissions and applicable restrictions to the remote user interface, which can then present authorized actions to the homeowner. For example, the homeowner could arm/disarm the system, access video feeds of their residence, adjust system settings, etc. In one implementation, the remote user interface may present the homeowner with available video feeds that can be selected and monitored by the user. In response to a user command to monitor video of one or more cameras, the remote user interface sends a request for remote access to the system. In response, the system captures video from the one or more cameras and generates a video stream that is sent to the remote user interface and presented to the homeowner. It is recognized that the format and resolution of the video may depend on a number of factors including the number of cameras selected, connection speed, screen size of the device running the remote user interface, power supply status, etc. If the system is configured to disable cameras to save power, as discussed above, the system may automatically enable one or more selected cameras in response to the request for remote video access.

While the homeowner is away and the system is armed, an employee at a security service may attempt to remotely login to the security system using a similar remote user interface as discussed above. Because the system is operating in a non-alarm state, the system determines that the security service has a restricted set of permissions, and denies remote video access for one or more cameras. Depending on how the homeowner has configured the system, the system may allow the security firm to monitor some video feeds such as outdoors, entrances to the residence, and common living areas (e.g., hallways, kitchen, etc.) while the system is in a non-alarm state.

Sometime later, while the homeowner is away and the system is armed, an intrusion sensor may activate (e.g. in response to a window breaking), which causes the system to enter an alarm state. In response to entering the alarm state, the system may take a number of actions, as discussed above, including activating monitoring devices (such as cameras and/or motion detectors), alerting the homeowner and/or security firm of the detected intrusion, automatically sending video data to the homeowner and/or security firm, etc. If the security firm remotely logs into the system while the alarm is active, the system will determine that the security firm is to be granted a higher level of permissions, which may include access to all video cameras on the residence.

After receiving the alert, the homeowner may also remotely log into the security system, as described above. Depending on the homeowner's configuration of the system the homeowner may have the same permissions in both alarm and non-alarm modes. The homeowner may determine that the detected intrusion was a false alarm and cancel the alarm using the remote user interface. As a result, the system is placed back into the armed state for example.

When the homeowner returns back to their residence, they may disarm the system using the keypad, at which time the system stops monitoring the intrusion sensors and other monitoring devices. As a result, remote video access is disabled for all users (although users having appropriate permissions may be able to remotely log in and arm the system).

In the evening, the homeowner may arm the system using the keypad or remote user interface from their smartphone or computer on the premises. As a result, the system resumes monitoring intrusion sensors as discussed above. As discussed in more detail in relation to FIG. 3 below, the system may allow the homeowner to customize multiple levels authentication based on a number of parameters (e.g., time of day). For example, because the homeowner is more likely to be home at night, the homeowner may configure the system to grant the security firm a lower set of permissions at night. For example, at night the homeowner may not allow the security firm to remotely monitor common living areas that were viewable during the day unless an intrusion is detected.

Figure 2:
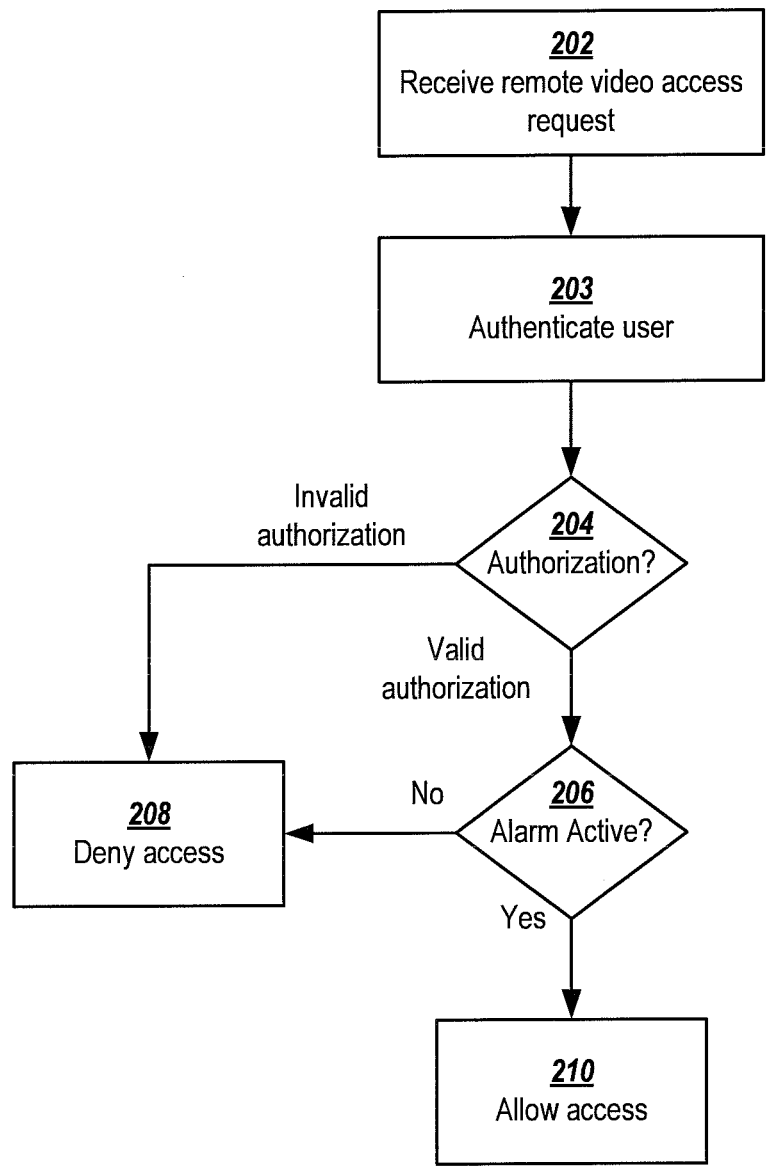
FIG. 2 shows a flowchart of an example process for determining whether to grant remote video access to a user, consistent with one or more embodiments of the present disclosure.

FIG. 2 shows a flowchart of an example process for determining whether to grant remote access to a user using permissions that are dependent on an alarm state of the system. A request for remote video access is received at block 202. The requesting user is authenticated at block 203 to determine is the user has authorization for remote video access. If the user has a valid authorization at decision block 204 and if there is an active alarm at decision block 206, the user is granted remote video access at block 210. If the user has an invalid authorization at decision block 204 or there is not an active alarm at decision block 206, the user is denied remote video access at block 208.

Figure 3:
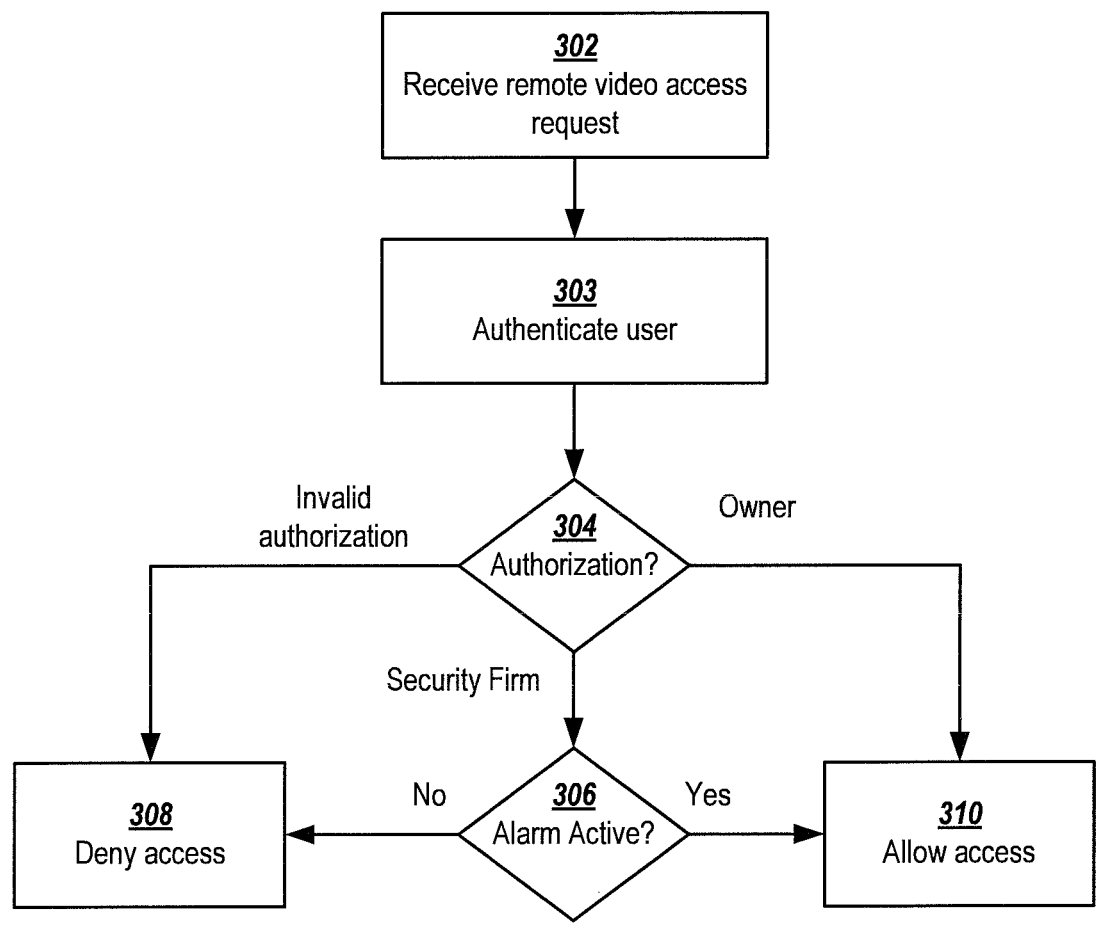
FIG. 3 shows a flowchart of another example process for determining whether to grant remote video access to users with different access permissions, consistent with one or more embodiments of the present disclosure.

FIG. 3 shows a flowchart of an example process for determining whether to grant remote access to users having different permissions that are dependent on an alarm state of the system. A request for remote video access is received at block 302. The requesting user is authenticated at block 303 to determine if the user has authorization for remote video access. If the user has an invalid authorization at decision block 304 or there is not an active alarm at decision block 306, the unauthorized user is denied remote video access.

Consistent with certain embodiments, the security system can be configured to provide different levels of access for different authorization levels. For instance, the remote user can provide authentication information that identifies the user as either a user at a third party security firm or a user that owns the security system. If the user is authorized as a security firm, at decision block 304, the user is granted remote video access only if an alarm is active at decision block 306. Otherwise, the security firm is denied remote video access at block 308. If the user is authorized as the owner at decision block 304, the user is granted remote video access at block 310, whether or not an alarm is active.

In one or more embodiments, multiple levels of authentication can be provided to limit various permissions of a user (e.g., ability to access video, adjust system settings, etc) by any combination of a number of parameters including user identification, location of monitoring devices, type of monitoring devices, time of day, location of remote access, etc. In one or more embodiments, the system may be adjusted by a user (such as a homeowner) as desired to configure customized permissions and restrictions of remote access for a number of remote users. For example, a homeowner may configure the system such that, unless an intrusion is detected, remote video access of a security firm may be limited to cameras covering entryways and landscape of a residence during the daytime and limited to cameras covering the landscape at night. As another example, permissions corresponding to the user identifier of a security firm may be limited by location of remote access such that the remote access (using the user identifier) will only be granted if the request comes from an IP address belonging to the security firm. The above example permissions and restrictions are provided for illustration and are not intended to limit the possible embodiments. The system may be configured to implement other permissions and/or restrictions as well.

Figure 4:
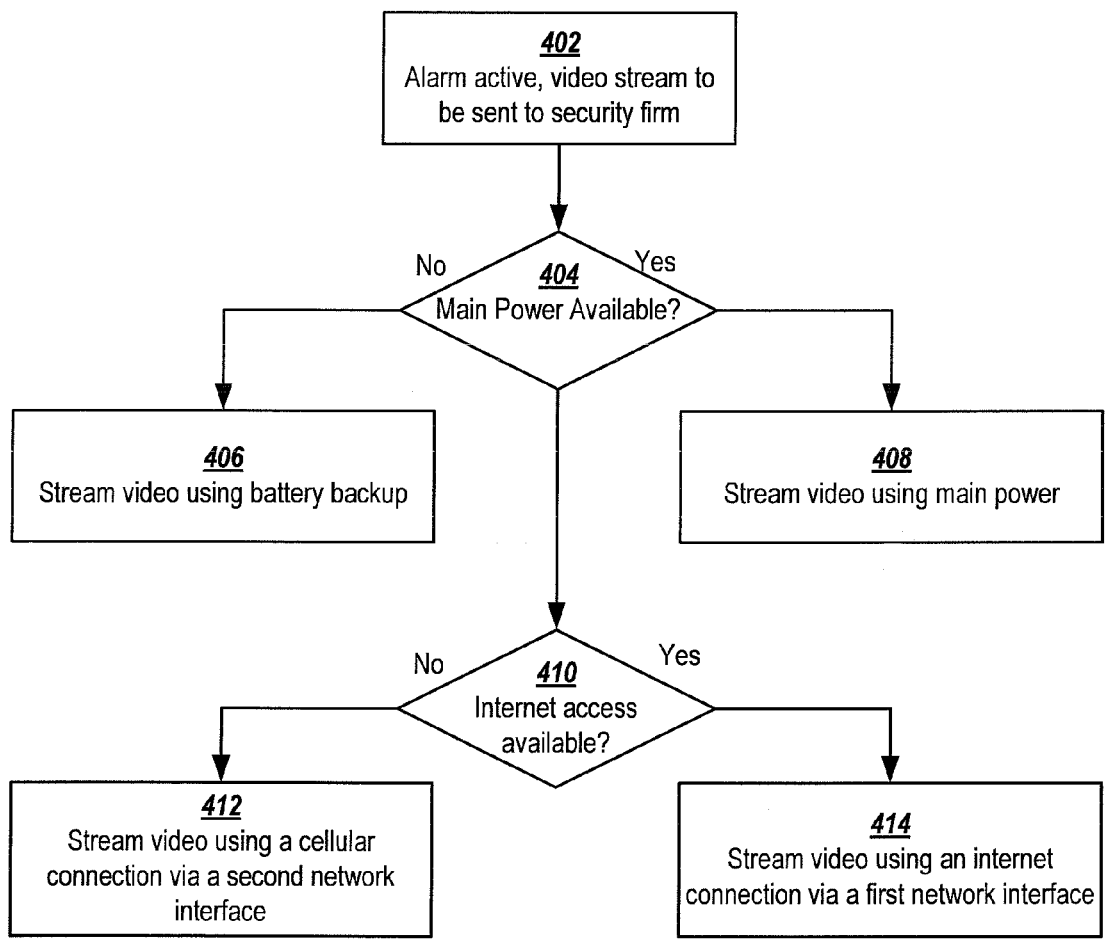
FIG. 4 shows a flowchart of example power and communications management processes to control backup power and communication systems, consistent with one or more embodiments of the present disclosure.

FIG. 4 shows a flowchart of an example power and communications management processes implementing backup power and communication systems. The system enters an alarm mode, in response to detecting an intrusion, at block 402 and a video stream is to be transmitted to a security firm. If main power is available at decision step 404, the system is configured to stream the video signals using the main system power at block 408. If main power is unavailable, the system is configured to stream the video using a battery power source at block 406. If Internet access is available to stream the video signals to the security firm via a first network interface at decision step 410, the system is configured to transmit the video stream to the security firm via the first network interface at block 414. Otherwise, if Internet access is unavailable via the first network interface at decision block 410, the system is configured to transmit the video stream to the security firm via a cellular connection using a second network interface at block 412, as discussed above.

In one or more embodiments, the system is configured to adjust the format and/or resolution of the video stream in response to availability of the primary power source and/or Internet access via the first network interface. For example in response to the internet access being available via the first network interface, the system may be configured to generate an Internet video stream using a lower resolution in comparison to a resolution used when Internet access is available. As another example, in response to the Internet access not being available via the first network interface, the system may be configured to generate and send a video clip, derived from the video signals, to the user over a cellular communication via the second network interface.

While certain aspects of the present invention have been described with reference to several particular example embodiments, those skilled in the art will recognize that many changes may be made thereto without departing from the spirit and scope of the present invention. Aspects of the invention are set forth in the following claims.

What is claimed is:

1. A monitoring system, comprising:
   a plurality of monitoring devices, including an imaging circuit, configured to generate respective video signals for monitoring a facility at which a first authorized user or another person is sometimes present;
   a control circuit including:
      a local area network (LAN) interface configured and arranged to receive the video signals generated by the plurality of monitoring devices; and
      a wide area network (WAN) interface; and
   a logic circuit coupled to the LAN and WAN interfaces, the logic circuit configured and arranged to:
      allow the first authorized user to disable the imaging circuit unless motion is detected by the plurality of monitoring devices;
      allow the first authorized user to enable the imaging circuit even if no motion is detected by the plurality of monitoring devices;
      in response to a request for remote access by a second authorized user via the WAN interface and the control circuit operating in an alarm state, allow the second authorized user remote access to the video signals;
      in response to a request for remote access by the second authorized user via the WAN interface and the control circuit operating in a non-alarm state, deny the second authorized user access to the video signals corresponding to a first subset of the plurality of monitoring devices for privacy of on-premise individuals in the facility and allow the second authorized user access to the video signals corresponding to a second subset of the plurality of monitoring devices; and
      allow the first authorized user to change the monitoring devices in the first subset of the plurality of monitoring devices and in the second subset of the plurality of monitoring devices and thereby change the remote access allowed by the second authorized user.

2. The monitoring system of claim 1, wherein the logic circuit is further configured and arranged to:
   in response to a request for remote access by the first authorized user, allow the first authorized user remote access to the video signals, and
   in response to allowed access after an alert is received, cancel the alarm state, in response to a user command received from the first authorized user, and re-arm the monitoring system; and
   wherein the first subset of the plurality of monitoring devices includes an imaging circuit, and wherein the logic circuit is further configured and arranged to deny the second authorized user access to the video signals for the privacy of on-premise individuals in the facility during limited times of the day designated as for privacy protection.

3. The monitoring system of claim 1, wherein the logic circuit is configured to allow the first authorized user remote access to the video signals by generating and sending an internet video stream, derived from the video signals, to the first authorized user via the WAN interface, the logic circuit is further configured to:
   in response to a request for remote access by the second authorized user and the control circuit operating in the alarm state, allow the second authorized user remote access to the video signals, and wherein the first authorized user and the second authorized user have different levels of permission to remotely access the system; and in response to at least one of the users accessing the system, selectively set the alarm using a plurality of the monitoring devices with the plurality of the monitoring devices respectively situated in zones of a facility in which the monitoring devices are installed, whereby the system is configurable for one mode of activation when the at least one of the users leaves the facility and another mode of activation of the facility when an authorized person is present in the facility.

4. The monitoring system of claim 3, wherein the WAN interface is configured and arranged to:

transmit the internet video stream from the logic circuit to the first or second authorized user via a first network interface; and in response to the first network interface not being available, transmit the internet video stream to the first or second authorized user via a second network interface.

5. The monitoring system of claim 4, wherein the second network interface is configured and arranged to communicate over a cellular communication network.

6. The monitoring system of claim 5, wherein the logic circuit is configured and arranged, in response to an internet access point used for sending the internet video stream not being available, to generate a second internet video stream using a lower resolution in comparison to a resolution used when the first network interface is available.

7. The monitoring system of claim 5, wherein the logic circuit is configured and arranged to, in response to the first network interface not being available, generate and send a video clip, derived from the video signals, to the first or second authorized user via the cellular communication network.

8. The monitoring system of claim 1, wherein:

each of the plurality of monitoring devices includes a motion detector;

the control circuit is configured and arranged to operate in the alarm state in response to operating in an armed state and one of the plurality of monitoring devices detecting motion with a corresponding motion detector; and wherein the first subset of the plurality of monitoring devices includes an imaging circuit, and wherein the logic circuit is further configured and arranged to deny the second authorized user access to the video signals for the privacy of on-premise individuals in the facility during limited times of the day designated as for privacy protection.

9. The monitoring system of claim 8, wherein each of the plurality of monitoring devices is configured and arranged to generate the respective video signals in response to the corresponding motion detector detecting motion.

10. The monitoring system of claim 8, further including an intrusion sensor configured and arranged to generate a signal that activates the motion detectors of the plurality of monitoring devices in response to sensing the intrusion.

11. The monitoring system of claim 1, wherein:

the control circuit and the plurality of monitoring devices each have a respective primary power source and a respective backup power source; and the control circuit and the plurality of monitoring devices are each configured to operate using the respective backup power source in response to the respective primary power source being unavailable.

12. The monitoring system of claim 1, wherein the first subset of the plurality of monitoring devices includes an imaging circuit, and wherein the logic circuit is further configured and arranged to deny the second authorized user access to the video signals for the privacy of on-premise individuals in the facility during limited times of the day designated as for privacy protection.

13. The monitoring system of claim 1, wherein the logic circuit is configured and arranged to:

store authorization information including an authentication level for each of the first and second users, each authentication level specifying permissions of each of the first and second users for enabling and disabling the image device, and for remotely accessing the video signals, allow the first user to disable and enable the imaging device based on the stored authorization information and authentication level for the first user, and allow or deny the second authorized user access to the video signals based on the stored authorization information and authentication level for the second user.

14. A monitoring system, comprising:

one or more monitoring devices, including an imaging circuit, configured and arranged to generate respective video signals for monitoring a facility at which a first authorized user or another person is sometimes present;

a control circuit including:

a local area network (LAN) interface configured and arranged to receive the video signals generated by the one or more monitoring devices;

a wide area network (WAN) interface; and a logic circuit coupled to the LAN and WAN interfaces, the logic circuit configured and arranged to, based on respective permission levels for accessing video for the first authorized user and a second authorized user:

allow the first authorized user to disable the imaging circuit unless motion is detected by the one or more monitoring devices;

allow the first authorized user to enable the imaging circuit even if no motion is detected by the one or more monitoring devices;

transmit video data, derived from the video signals, to the authorized user via the WAN interface, in response to entering an alarm state of operation or satisfaction of one or more additional parameters; and while in a non-alarm state of operation and in an absence of the one or more additional parameters, deny the second authorized user remote access to the video signals for privacy of on-premise individuals in the facility and during limited times of the day designated as for privacy protection.

15. The monitoring system of claim 14, wherein the additional parameters include at least one parameter selected from the group consisting of location of the one or more monitoring devices, type of monitoring devices, time of day, and location of remote access; and wherein the logic circuit is further configured to allow remote access to the video signals, and in response to allowed access by the first authorized user after an alert is received, the logic circuit is further configured and arranged to cancel the alarm state, in response to a user command received from the first authorized user, and re-arm the monitoring system.

16. The monitoring system of claim 14, wherein
the WAN interface is configured and arranged to:
  transmit the video data to the first authorized user via an internet access point, if available; and
  in response to the internet access point not being available, transmit the video data to the first authorized user via a cellular communication service using a second network interface; and
the logic circuit is further configured and arranged to, in response to the first authorized user accessing the system, selectively set the alarm using a plurality of the monitoring devices with the plurality of the monitoring devices respectively situated in zones of a facility in which the monitoring devices are installed, whereby the system is configurable for one mode of activation when the first authorized user leaves the facility and another mode of activation of the facility when another authorized person is present in the facility.

17. The monitoring system of claim 16, wherein the video data is a video clip of a fixed length.

18. The monitoring system of claim 16, wherein the video data is an internet video stream, derived from the video signals.

19. The monitoring system of claim 18, wherein the logic circuit is configured and arranged to:
  generate the video data using a first video encoding, in response to a first network interface providing higher resolution communication being available; and
  generate the video data using a second video encoding, in response to the first network interface not being available, the first video encoding being a higher quality than the second video encoding.

20. The monitoring system of claim 16, wherein the control circuit is configured and arranged to:
  transmit a fixed length video clip, derived from the video signals to the first authorized user, in response to entering an alarm state of operation and a first network interface providing higher resolution communication being unavailable; and
  transmit an internet video stream to the first authorized user, in response to entering an alarm state of operation and the first network interface being available.

21. The monitoring system of claim 16, wherein the control circuit is configured and arranged to:
  transmit an internet video stream, derived from the video signals to the first authorized user, in response to entering an alarm state of operation and a first network interface providing higher resolution communication being unavailable; and
  transmit an internet video stream to the first authorized user, in response to entering an alarm state of operation and the first network interface being available.

* * * * *